(No Model.) 3 Sheets—Sheet 1.
L. MALEN.
PORTABLE KITCHEN.

No. 434,548. Patented Aug. 19, 1890.

Witnesses
Gust. Dieterich.
William Goebel.

Inventor
Louis Malen
by
Briesen & Knauth
his Attorneys

THE NORRIS PETERS CO., PHOTO-LITHO., WASHINGTON, D. C.

(No Model.) 3 Sheets—Sheet 2.

L. MALEN.
PORTABLE KITCHEN.

No. 434,548. Patented Aug. 19, 1890.

Witnesses
Gust. Dietrich.
William Goebel.

Inventor
Louis Malen
by Briesen & Knauth
his attorneys

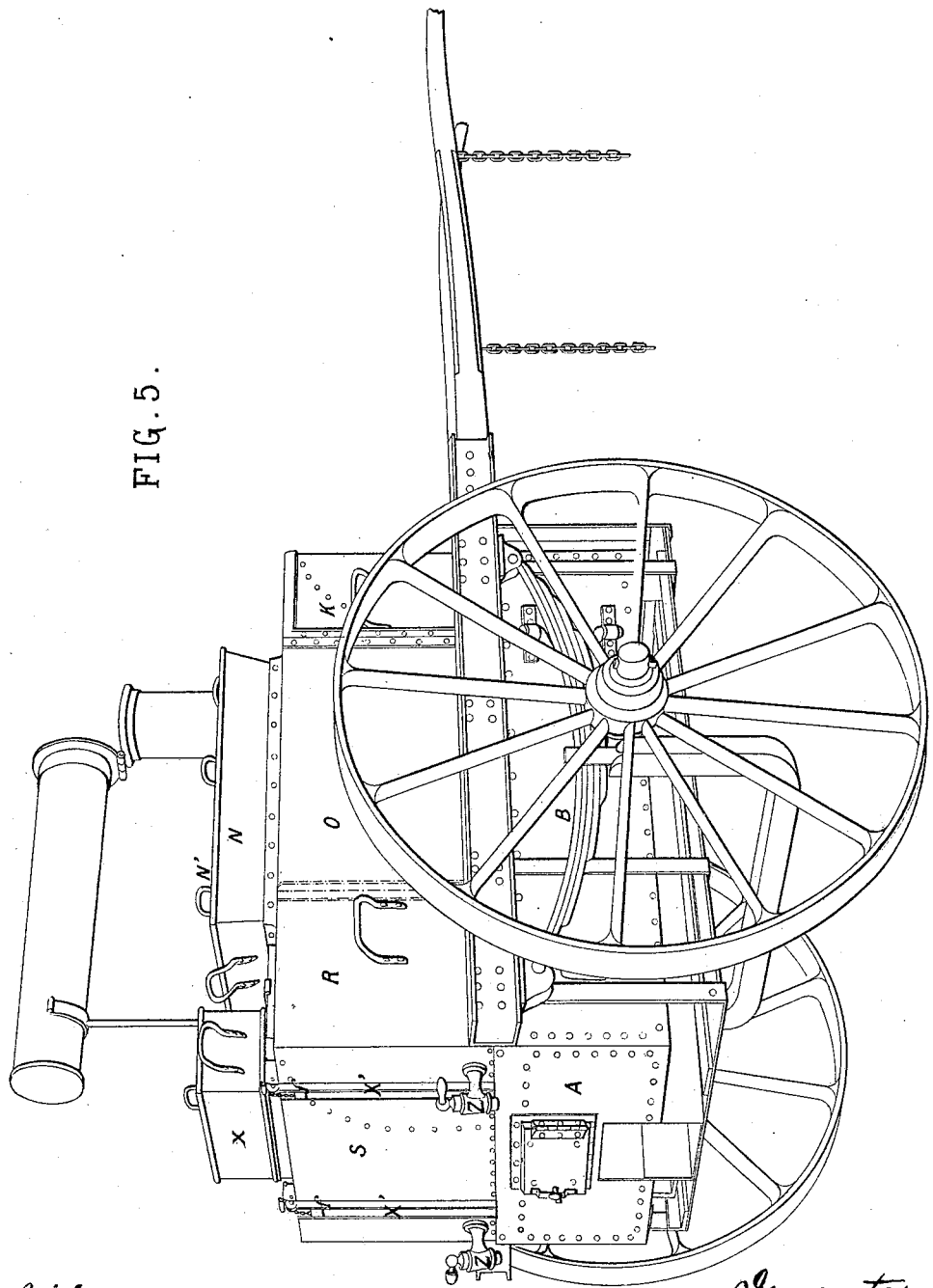

UNITED STATES PATENT OFFICE.

LOUIS MALEN, OF PARIS, FRANCE.

PORTABLE KITCHEN.

SPECIFICATION forming part of Letters Patent No. 434,548, dated August 19, 1890.

Application filed June 12, 1890. Serial No. 355,172. (No model.)

*To all whom it may concern:*

Be it known that I, LOUIS MALEN, a resident of Paris, France, and a citizen of the French Republic, have invented an Improved Portable Kitchen, of which the following is a specification.

The object of my invention is to provide a compact and convenient portable kitchen which can be utilized in public squares, in the field, &c., and which is particularly adapted to the needs of an army on the march.

The kitchen possesses all the appurtenances and answers all the purposes of the usual kitchen; and it consists in the main of a furnace having the cooking appurtenances so fitted that they cannot easily be displaced by any jolting while in transit, as hereinafter described.

Reference is to be had to the accompanying drawings, forming a part of this specification, in which—

Figure 1:
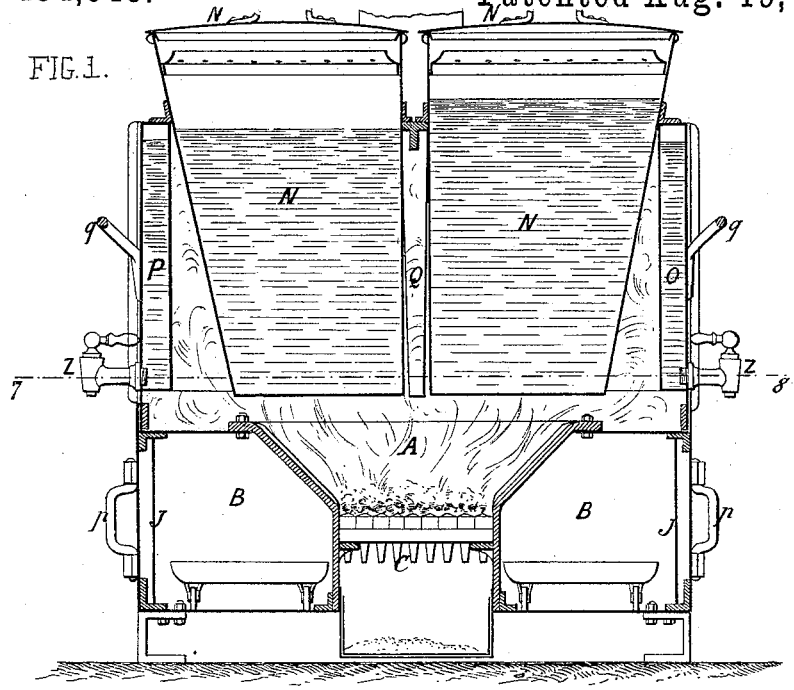
Figure 4:
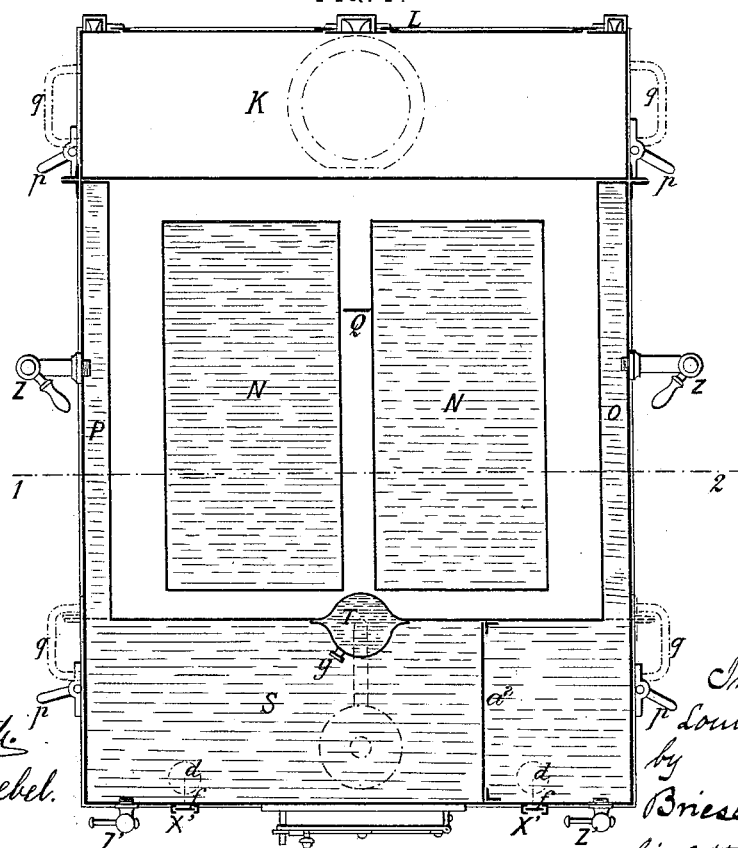
Figure 2:
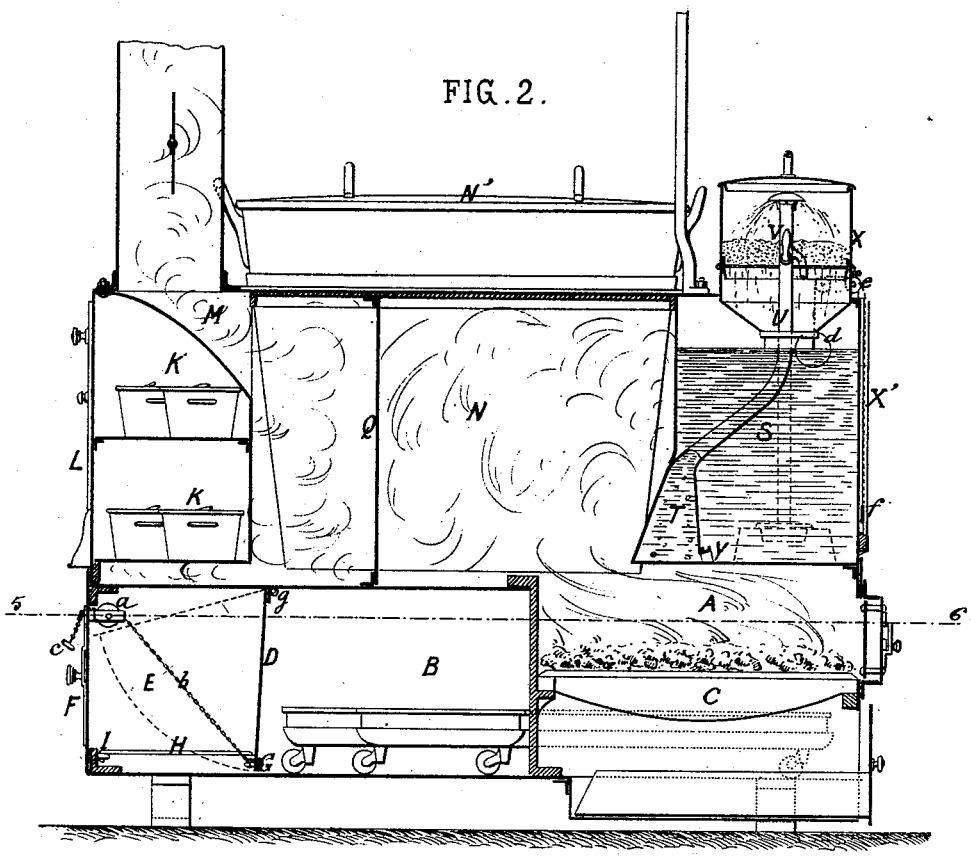
Figure 3:
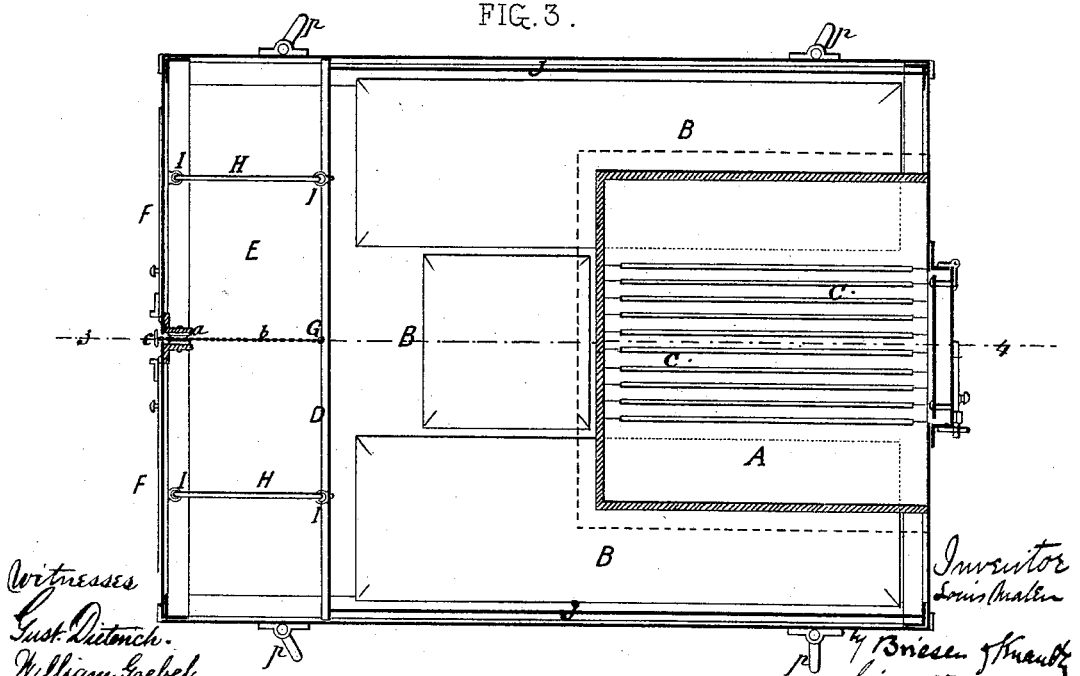

Figure 1 is a vertical section of my improved kitchen on the line 1 2, Fig. 4. Fig. 2 is a vertical section of the same on the line 3 4, Fig. 3. Fig. 3 is a horizontal section on the line 5 6, Fig. 2. Fig. 4 is a horizontal section on the line 7 8, Fig. 1. Fig. 5 is a perspective view of my kitchen ready for transportation.

In the drawings, A represents the furnace portion, which is surrounded on three sides by the U-shaped roasting-oven B. (See Fig. 3.) The said furnace A has a movable grate C. A movable partition D separates the roasting-oven B at the back from the compartment E, which may serve as a receptacle for cooked dishes which it is desired to keep warm. The said movable partition D can be raised or lowered by a chain $b$, which is attached to the lower point G of the partition, and which is operated by the button $c$ on the outside of the apparatus, the chain running over the pulley $a$. The said partition D is hinged at $g$, and when raised takes the position of the dotted line, Fig. 2. The partition when down is held in place by the rigid cross-bars H, (shown in Figs. 2 and 3,) the object of these parts being to hold the partition D firm when the kitchen is jolted while on a journey. The doors F F behind the chamber E afford access to the interior of the warming-chamber E and the ovens B. The ovens have double walls J, for confining therein a stationary column of air to keep the heat.

Above the furnace A is placed the reservoir for coffee S, which contains convenient means of showing the level of water therein—such as a float $d$, attached to a chain running over pulleys $e$, and having a weight $f$ attached to its end, the fluctuation of the weight $f$ telling the height of the water in the reservoir. The coffee-reservoir S may be divided by a partition $a^2$ into two parts O P, each having a faucet Z and float $d$. Thus one reservoir O may be for tea, hot water, chocolate, &c., the other P for coffee.

Above the chamber E are the warming-pans K K, which are closed by the door L.

Directly above the oven B are the kettles N, placed side by side and in a suitable frame which is supported in the center by the brace Q. The kettles have covers N'.

It will be seen that this kitchen is composed of two series of chambers, a lower series A B E and an upper series O, P, N, and K. All these chambers are in contact with the products of combustion and therefore conveniently heated.

Fig. 2 clearly shows that the products of combustion from the fire-place A pass above the oven B and above the warming-chamber E and beneath the warming-chamber K, whose inner upright faces they also skirt. At the same time the products of combustion heat the under side of the water-reservoirs O P and the lower parts of the removable kettles N. By raising the partition D the extent of the oven may be increased; but when greater heat in a smaller oven is needed the partition D is let down and secured rigidly by the braces H.

Having now described my invention, what I claim is—

1. In a portable cooking apparatus, the combination of the lower series of chambers A, B, and E with the upper series of chambers O, P, N, and K, all arranged as described, the chamber A being the furnace, the U-shaped chamber B the oven embracing the furnace on three sides, the chamber E behind the oven being separated by the movable partition D from the oven, the chambers O P in the upper series being reservoirs for liquids to be heated, the chambers N being removable kettles, and the chamber K being a warming-chamber, all said chambers being arranged to be reached by the products of combustion that escape from the furnace A to the chimney M, substantially as described.

2. The combination of the oven B with the furnace A, which is embraced by said oven on three sides, with the movable partition D, separating the oven B from the chamber E, with means, substantially as described, for lifting the partition D, and with the braces H, for holding the partition D rigidly when lowered, substantially as herein shown and described.

LOUIS MALEN.

Witnesses:
J. L. RATHBONE,
R. J. PRESTON.